(12) United States Patent
Kamada (10) Patent No.: US 8,226,511 B2
(45) Date of Patent: Jul. 24, 2012

(54) BICYCLE SPROCKET TOOTH WITH A SHIFT ASSIST RADIUS GREATER THAN A REFERENCE TOOTH RADIUS

(75) Inventor: Kenji Kamada, Abeno-ku (JP)

(73) Assignee: Shimano, Inc., Sakai (JP)

( * ) Notice: Subject to any disclaimer, the term of this patent is extended or adjusted under 35 U.S.C. 154(b) by 1060 days.

(21) Appl. No.: 10/905,531

(22) Filed: Jan. 8, 2005

(65) Prior Publication Data

US 2006/0154767 A1    Jul. 13, 2006

(51) Int. Cl.
*F16H 55/30* (2006.01)

(52) U.S. Cl. ............... 474/160; 474/152; 474/164

(58) Field of Classification Search .......... 474/152, 474/160, 164, 158, 161, 162
See application file for complete search history.

(56) References Cited

U.S. PATENT DOCUMENTS

| | | | |
|---|---|---|---|
| 4,268,259 A | 5/1981 | Segawa et al. | |
| 4,392,841 A * | 7/1983 | Juy | 474/156 |
| 4,519,791 A * | 5/1985 | Nagano | 474/152 |
| 4,889,521 A * | 12/1989 | Nagano | 474/164 |
| 5,192,248 A * | 3/1993 | Nagano | 474/140 |
| 5,192,249 A * | 3/1993 | Nagano | 474/160 |
| 5,503,598 A | 4/1996 | Neuer et al. | |
| 5,514,042 A | 5/1996 | Liou | |
| 5,545,096 A * | 8/1996 | Su | 474/160 |
| 5,569,107 A | 10/1996 | Mu | |
| 5,609,536 A | 3/1997 | Hsu | |
| 5,733,215 A | 3/1998 | Hsu et al. | |
| 5,738,603 A * | 4/1998 | Schmidt et al. | 474/158 |
| 5,876,296 A | 3/1999 | Hsu et al. | |
| 5,935,033 A * | 8/1999 | Tseng et al. | 474/160 |
| 6,045,472 A | 4/2000 | Sung et al. | |
| 6,139,456 A * | 10/2000 | Lii et al. | 474/152 |
| 6,340,338 B1 * | 1/2002 | Kamada | 474/160 |
| 6,428,436 B1 * | 8/2002 | Woyach et al. | 474/152 |
| 6,923,741 B2 * | 8/2005 | Wei | 474/160 |
| 7,128,672 B2 * | 10/2006 | Chattin | 474/141 |
| D540,718 S * | 4/2007 | Wickliffe | D12/123 |
| 2002/0086753 A1 * | 7/2002 | Yahata | 474/160 |
| 2004/0009838 A1 * | 1/2004 | Valle | 474/160 |

(Continued)

FOREIGN PATENT DOCUMENTS

DE    2837270 C2    3/1986

(Continued)

OTHER PUBLICATIONS

Engineering Drawing of the sprockets depicted in OBV-1, Aug. 1990.*

(Continued)

*Primary Examiner* — Bradley King
*Assistant Examiner* — Thomas Irvin
(74) *Attorney, Agent, or Firm* — James A. Deland (57) ABSTRACT

A bicycle sprocket comprises a sprocket body having a first side surface and a second side surface, a plurality of sprocket teeth extending radially outwardly from a root portion of the sprocket body, and a shift assist recess formed in the root portion below a first sprocket tooth at the first side surface of the sprocket body. A radially outermost surface of a second sprocket tooth defines a reference tooth radius, and a radially outermost surface of a third sprocket tooth defines a shift assist tooth radius. The radially outermost surface of the third sprocket tooth has a convex shape, and the shift assist tooth radius is greater than the reference tooth radius.

14 Claims, 8 Drawing Sheets

U.S. PATENT DOCUMENTS

| | | | |
|---|---|---|---|
| 2004/0043855 A1* | 3/2004 | Wei | 474/160 |
| 2004/0259674 A1* | 12/2004 | Pfister | 474/152 |
| 2005/0079940 A1* | 4/2005 | Reiter | 474/160 |
| 2006/0128511 A1* | 6/2006 | Oishi et al. | 474/160 |

FOREIGN PATENT DOCUMENTS

| | | |
|---|---|---|
| DE | 3936921 A1 | 5/1990 |
| DE | 29610398 U1 | 10/1996 |
| DE | 10119590 A1 | 10/2002 |
| EP | 0034445 B1 | 8/1981 |
| EP | 0313345 A2 | 4/1989 |
| EP | 0417696 B1 | 3/1991 |
| EP | 0444557 A1 | 9/1991 |
| EP | 0444645 A1 | 9/1991 |
| EP | 0474139 B1 | 3/1992 |
| EP | 0479032 B1 | 4/1992 |
| EP | 1413508 A2 | 4/2004 |
| TW | 157590 | 5/1991 |
| TW | 230959 | 9/1994 |
| TW | 314043 | 8/1997 |

OTHER PUBLICATIONS

European search report for EP 06000192.2, the European application which is the equivalent of this application, dated Oct. 27, 2006.

Undated English translation of a cancellation brief pertaining to Taiwanese application No. 09441926, the Taiwanese equivalent of this application.

Opposition document filed Jan. 7, 2010 in the European Patent Office.

Cross-reference to documents cited in the EPO Opposition Document, dated Jan. 7, 2010.

Photographs of Shimano "Hyperglide" sprockets, manufactured Jun. 1990, described as Enclosure OVB-1 in the EPO Opposition Document.

List of Shimano manufacturing codes, described as Enclosure OVB-2 in the EPO Opposition Document.

List of Shimano product codes, 1990, described as Enclosure OVB-3 in the EPO Opposition Document.

1998 "Shimano Bicycle System Components" Dealer Sales and Support Manual, pp. 72-73, published Jun. 1997, described as Enclosure OVB-4 in the EPO Opposition Document.

Brugelmann Radwelt '99 Catalog; pp. 5, 433, 438, and 706; published Jan. 1999, described as Enclosure OVB-5 in the EPO Opposition Document.

Fahrrad Brugelmann packing slip dated Aug. 2, 1999, described as Enclosure OVB-6 in the EPO Opposition Document.

* cited by examiner

BICYCLE SPROCKET TOOTH WITH A SHIFT ASSIST RADIUS GREATER THAN A REFERENCE TOOTH RADIUS

BACKGROUND OF THE INVENTION

The present invention is directed to bicycles and, more particularly, to a multistage sprocket assembly for a bicycle, wherein the multistage sprocket assembly comprises at least one larger diameter sprocket and at least one smaller diameter sprocket that are mounted on a rear hub of the bicycle so as to shift a driving chain for changing the bicycle speed.

U.S. Pat. No. 4,889,521 discloses a multistage sprocket assembly that includes at least one larger diameter sprocket and at least one smaller diameter sprocket assembled in a relationship such that the center point between a pair of adjacent teeth at the larger diameter sprocket and the center point between a pair of adjacent teeth at the smaller diameter sprocket are positioned on a tangent extending along the chain path when the chain is being shifted from the smaller diameter sprocket to the larger diameter sprocket. The distance between the center points is substantially equal to an integer multiple of the chain pitch. A chain guide portion is provided at the inside surface of the larger diameter sprocket at a position corresponding to the path of the chain when the chain travels between the center points for allowing the chain to move axially of the sprocket assembly slightly toward the larger diameter sprocket. This facilitates shifting the chain from the smaller diameter sprocket to the larger diameter sprocket. One or more teeth on the larger diameter sprocket may be offset or inclined from a centerline of the sprocket body to further facilitate shifting the chain from the smaller diameter sprocket to the larger diameter sprocket.

SUMMARY OF THE INVENTION

The present invention is directed to various features of a bicycle sprocket. In one embodiment, a bicycle sprocket comprises a sprocket body having a first side surface and a second side surface, a plurality of sprocket teeth extending radially outwardly from a root portion of the sprocket body, and a shift assist recess formed in the root portion below a first sprocket tooth at the first side surface of the sprocket body. A radially outermost surface of a second sprocket tooth defines a reference tooth radius, and a radially outermost surface of a third sprocket tooth defines a shift assist tooth radius. The radially outermost surface of the third sprocket tooth has a convex shape, and the shift assist tooth radius is greater than the reference tooth radius. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
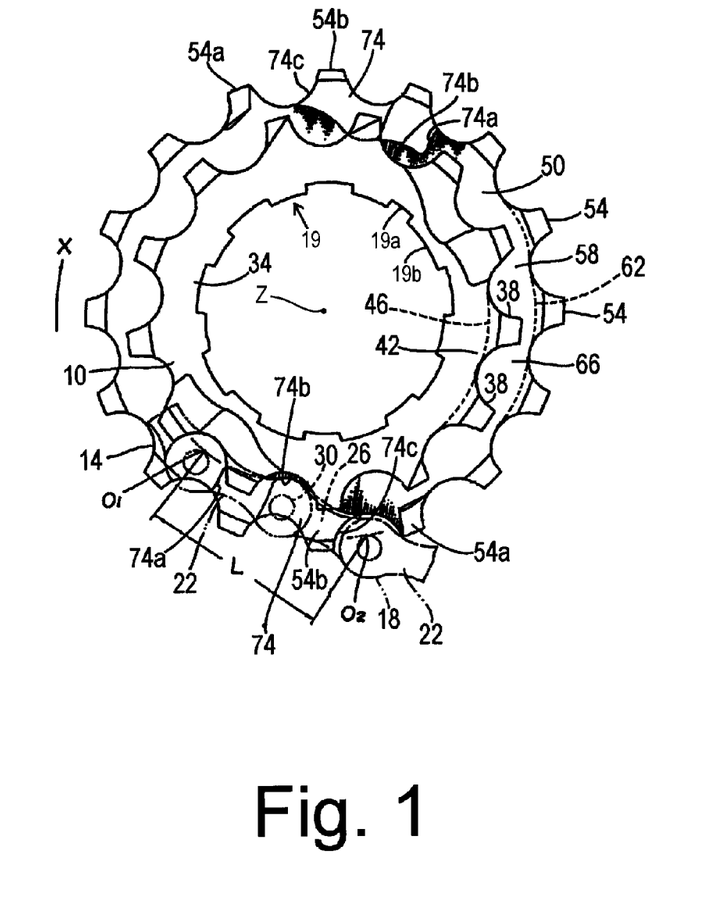
FIG. 1 is a side view of a particular embodiment of first and second sprockets.

FIG. 1 is a side view of a particular embodiment of a smaller diameter first sprocket 10 and a larger diameter second sprocket 14. Sprockets 10 and typically form part of a multiple sprocket cluster wherein a plurality of, e.g., two through nine sprockets are coaxially mounted together and axially spaced apart from each other by a predetermined distance for rotation around a common axis Z such as that defined by a rear wheel hub axle. When mounted for rotation around a wheel hub axle, sprockets 10 and 14 typically are mounted around a tubular sprocket-mounting sleeve (not shown) though a plurality of splines 19 that engage a corresponding plurality of splines on the sprocket mounting sleeve in a known manner. A radially outwardly extending spline 19a and a radially inwardly extending spline 19b on each sprocket usually has a different shape from the remaining splines 19 to fix each of the plurality of sprockets at a predetermined rotational position relative to its adjacent sprocket (s). The sprocket mounting sleeve is, in turn, rotatably mounted around the hub axle through a plurality of ball bearings and a one-way clutch in a known manner.

Small diameter sprocket 10 comprises a sprocket body 34 and a plurality of sprocket teeth 38 extending radially outwardly from a root portion 42 of sprocket body 34. Root portion 42 extends radially inwardly from a root circle 46 of sprocket body 34. As is well known, a root circle is a hypothetical circle defined by the bottom of the tooth spaces of a sprocket.

Figure 2A:
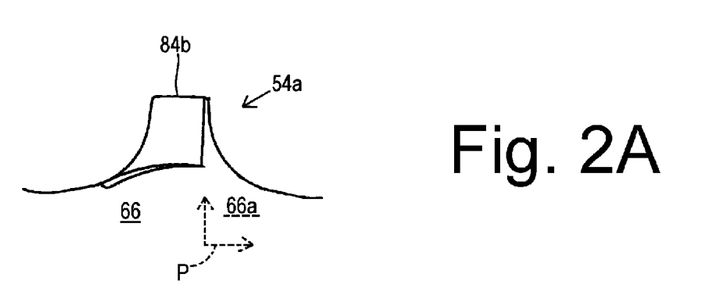
FIG. 2A is a front view of a particular embodiment of a shift assist tooth.
Figure 2B:
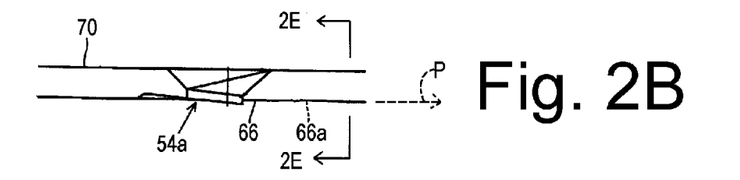
FIG. 2B is a top view of the shift assist tooth.

Similarly, larger diameter sprocket 14 comprises a sprocket body 50 and a plurality of sprocket teeth 54 extending radially outwardly from a root portion 58 of sprocket body 50. Root portion 58 extends radially inwardly from a root circle 62 of sprocket body 50. In this embodiment, sprocket body 50 has a first side surface 66 and a second side surface 70 (FIG. 2B), wherein a root portion side surface 66a (FIGS. 2B and 2C) of first side surface 66 at root portion 58 defines a root portion plane P.

Sprockets 10 and 14 are assembled in a relationship such that a center point O1 between a pair of adjacent teeth 38 of smaller diameter sprocket 10 and a center point O2 between a pair of adjacent teeth 54 of larger diameter sprocket 14 are positioned on a tangent which, as shown by the chain line in FIG. 1, extends along a path of a driving chain 18 when chain 18 is being shifted from smaller diameter sprocket 10 to larger diameter sprocket 14. Chain 18 has a typical construction wherein pairs of outer link plates 22 alternate with pairs of inner link plates 26, and each pair of link plates is connected to the adjacent pair of link plates through a connecting pin 30. Preferably, a distance L between centers O1 and O2 is substantially equal to an integer multiple of the chain pitch (distance between connecting pins 30) of chain 18.

Figure 3:
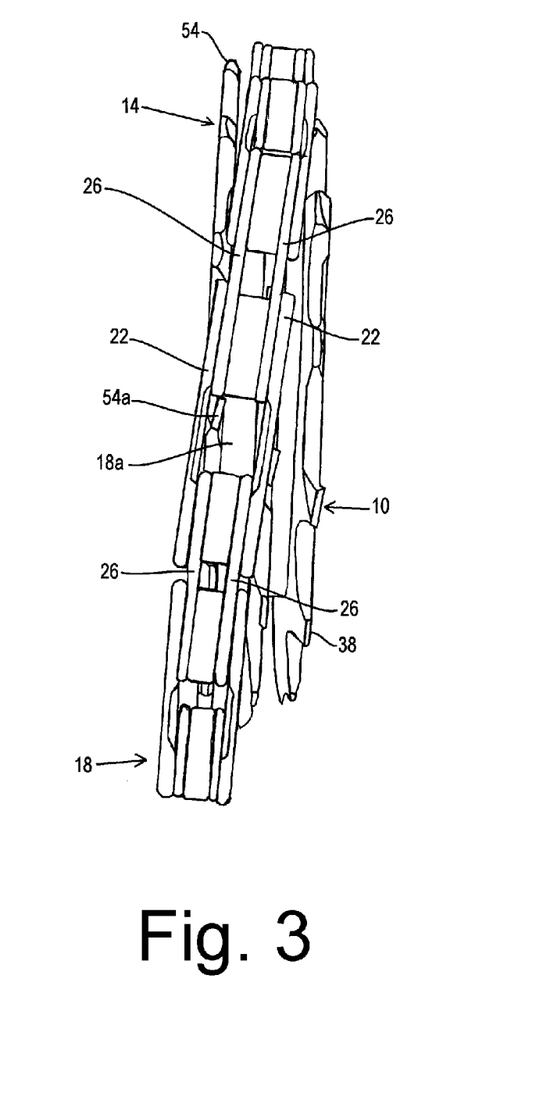
FIG. 3 is a top view illustrating shifting of a bicycle chain from the first sprocket to the second sprocket when the shift assist tooth is aligned with an outer link plate of a bicycle chain.
Figure 4:
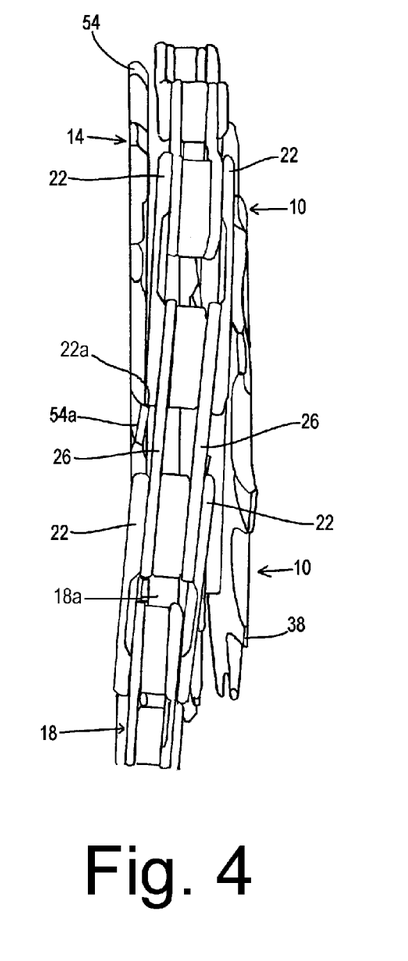
FIG. 4 is a top view illustrating shifting of the bicycle chain from the first sprocket to the second sprocket when the shift assist tooth is aligned with an inner link plate of the bicycle chain.
Figure 5:
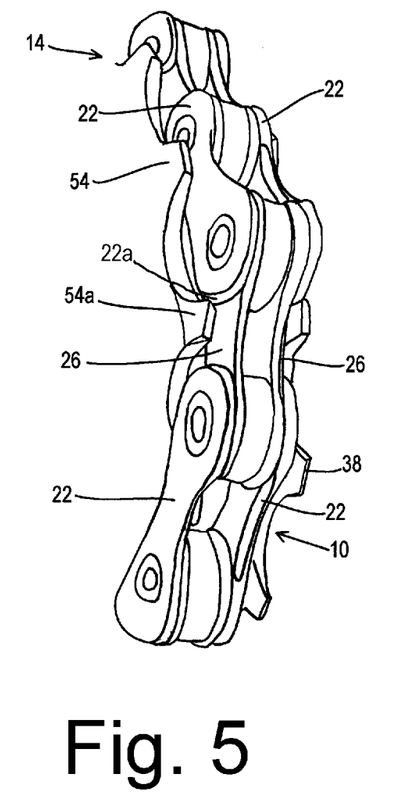
FIG. 5 is an oblique view illustrating shifting of the bicycle chain from the first sprocket to the second sprocket when the shift assist tooth is aligned with the inner link plate of the bicycle chain.

A shift assist recess 74 allowing chain 18 to deviate toward larger diameter sprocket 14 is recessed at first side surface 66 of sprocket body 50 at a position corresponding to a traveling path of chain 18 when chain travels between centers O1 and O2. Shift assist recess 74 is recessed preferably deep enough to prevent inner link plate 26 of chain 18 from riding on at least one shift assist tooth 54a of larger diameter sprocket 14 (two such teeth 54a are shown in FIG. 1), each shift assist tooth 54a being positioned behind each center O2 of larger diameter sprocket 14 relative to a driving rotation direction X of sprockets 10 and 14. Shift assist recess 74 also is large enough to receive the link plates of chain 18 facing larger diameter sprocket 14 therein. As a result, chain 18 can deviate a predetermined amount toward second surface 70 of larger diameter sprocket 14 so that shift assist tooth 54a engages a space 18a (FIG. 3) between outer link plates 22 when outer link plates 22 align with shift assist tooth 54a. Also, inner link plates 26 of chain 18 are prevented from riding on shift assist tooth 54a when inner link plates 26 align with shift assist tooth 54a as shown in FIGS. 4 and 5. This allows the following tooth 54 behind shift assist tooth 54a in the driving rotation direction X to engage the space 18a in the next pair of outer link plates 22. Of course, shift assist recess 74 may be formed of a cutout instead of a recess. The number of teeth spanned by shift assist recess 74 can be increased or reduced depending upon the application, and it is preferable in some applications to span only one tooth, such as tooth 54b.

In this embodiment, shift assist recess 74 is formed from an initial end edge 74a somewhat spaced apart from center O1, wherein initial end edge 74a is positioned between the two adjacent teeth 38 that define center O1 at smaller diameter sprocket 10 and is positioned between center O1 and center O2. Initial end edge 74a extends radially inwardly to a bottom edge 74b. Bottom edge 74b extends to a termination 74c, wherein termination 74c extends into approximately the bottom of the space between shift assist tooth 54a and a tooth 54b positioned ahead of shift assist tooth 54a in the rotation direction X. Shift assist recess 74 may be laterally inclined to further assist the shifting of chain 18 from smaller diameter sprocket 10 to larger diameter sprocket 14. Laterally thinner teeth spanned by shift assist recess 74 may be increased in circumferential width to increase the strength of those teeth.

Each shift assist tooth 54a is configured to assist the shifting of chain 18 from smaller diameter sprocket 10 to larger diameter sprocket 14. The other teeth 54 are configured to be neutral with respect to the shifting of chain 18 from smaller diameter sprocket 10 to larger diameter sprocket 14, or even formed so as to discourage the shifting of chain 18 from smaller diameter sprocket 10 to larger diameter sprocket 14 in a known manner.

Figure 2C:
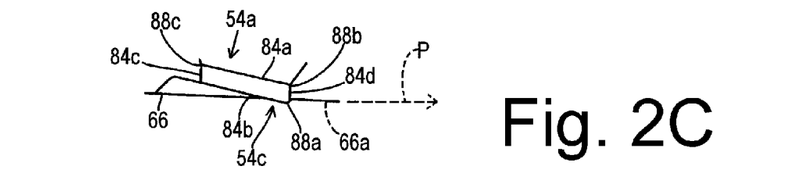
FIG. 2C is a more detailed top view of the shift assist tooth.
Figure 2D:
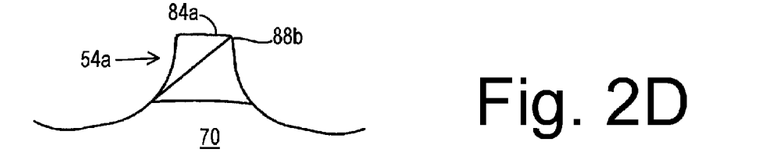
FIG. 2D is a rear view of the shift assist tooth.
Figure 2E:
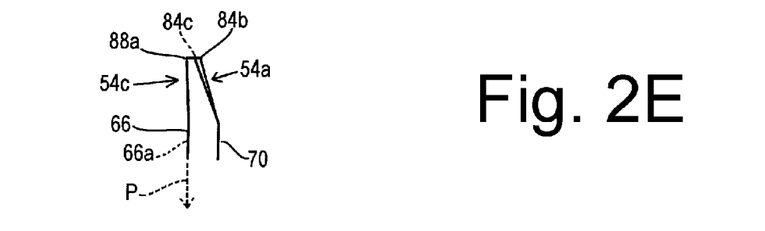
FIG. 2E is a view taken along line 2E-2E in FIG. 2B.

As shown in FIG. 2C, in this embodiment shift assist tooth 54a includes top edges 84a, 84b, 84c and 84d that form the shape of a parallelogram. More specifically, top edges 84a and 84b are substantially straight and substantially parallel to each other and are inclined relative to root portion plane P, and top edges 84c and 84d are substantially straight and substantially parallel to each other and are oriented substantially perpendicular to root portion plane P. Shift assist tooth 54a also includes a projecting portion 54c that extends to a corner 88a formed between top edges 84b and 84d. Projecting portion 54c extends laterally outwardly from root portion plane P at first side surface 66.

One advantage of projecting portion 54c is that a portion of top edge 84d in proximity to corner 88a forms an abutment for contacting a forward edge 22a of outer link plate 22 of chain 18 when inner link plates 26 align with shift assist tooth 54a as shown in FIGS. 4 and 5. This helps to ensure proper pitch alignment of chain 18 with teeth 54 of larger diameter sprocket 14 so that the following pair of outer link plates 22 reliably engage the tooth 54 following shift assist tooth 54a.

In this embodiment, corner 88a extends approximately 0.2 mm from root portion plane P when sprocket body 66 has a thickness of approximately 1.6 mm. Of course, the amount of extension from root portion plane P may vary depending upon the application, and the maximum extension will be determined by the size of the chain and the lateral distance between smaller diameter sprocket 10 and larger diameter sprocket 14 so as to prevent corner 88a from touching chain 18 when chain 18 is engaged with smaller diameter sprocket 10. In known sprocket configurations, corner 88a could extend up to approximately 0.4 mm from root portion plane P.

Because projecting portion 54c extends laterally outwardly from root portion plane P, a corner 88b formed between top edges 84a and 84d may be recessed further than known shift assist tooth designs to further assist the shifting of chain 18 from smaller diameter sprocket 10 to larger diameter sprocket 14 without sacrificing the strength of shift assist tooth 54a. In this embodiment, corner 88b is recessed approximately 1.3 mm from second side surface 70. Of course, corner 88b could be recessed even further in other embodiments, such as those embodiments where corner 88a projects further from root portion plane P.

Similarly, because projecting portion 54c extends laterally outwardly from root portion plane P, a corner 88c formed between top edges 84a and 84c may be recessed further than known shift assist tooth designs to further assist the shifting of chain 18 from smaller diameter sprocket 10 to larger diameter sprocket 14 without sacrificing the strength of shift assist tooth 54a. In this embodiment, corner 88c is recessed approximately 1.0 mm from second side surface 70. Of course, corner 88c could be recessed even further in other embodiments, such as those embodiments where corner 88a projects further from root portion plane P.

Figure 6:
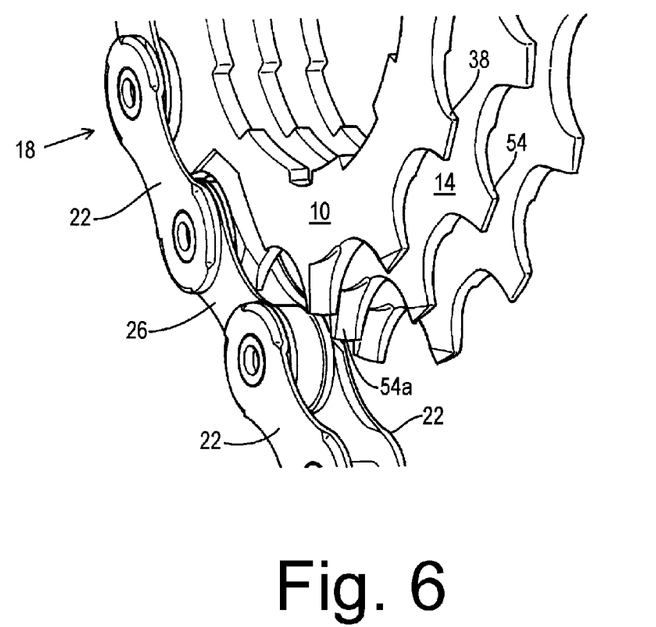
FIG. 6 is an oblique view illustrating shifting of the bicycle chain from the first sprocket to the second sprocket when the shift assist tooth is aligned with the outer link plate of the bicycle chain and the derailleur movement is less than anticipated.

FIG. 6 is an oblique view illustrating shifting of bicycle chain 18 from smaller diameter sprocket 10 to larger diameter sprocket 14 when shift assist tooth 54a aligns with outer link plates 22 of bicycle chain 18 and the derailleur movement is less than anticipated. In this case, the tip of shift assist tooth 54a does not reliably catch the inner surface of its adjacent outer link plate 22, and failure of shifting may occur.

Figure 7A:
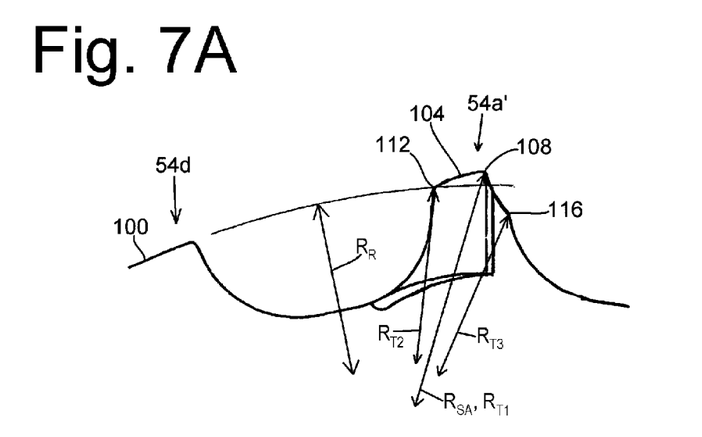
FIG. 7A is a front view of another embodiment of the shift assist tooth.
Figure 7B:
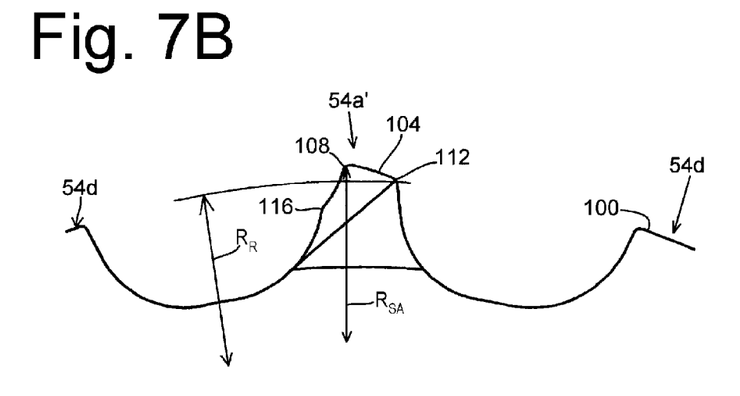
FIG. 7B is a rear view of the shift assist tooth shown in FIG. 7A.

To avoid this problem, shift assist tooth 54a may be modified into a shift assist tooth 54a' as shown in FIGS. 7A and 7B. The structure of shift assist tooth 54a' is the same as shift assist tooth 54a in the above embodiment except for the following differences. In this embodiment, a radially outermost surface 100 of a sprocket tooth 54d defines a reference tooth radius $R_R$, and a radially outermost surface 104 of shift assist tooth 54a' (both shift assist teeth 54a in FIG. 1 are formed as shift assist teeth 54a' in this embodiment) defines a shift assist tooth radius $R_{SA}$, wherein shift assist tooth radius $R_{SA}$ is greater than reference tooth radius $R_R$, and all radii disclosed in this embodiment originate from axis Z. There may be any number of sprocket teeth 54d, including sprocket tooth 54b in the first embodiment, and in this embodiment every sprocket tooth that is not a shift assist tooth 54a' is a sprocket tooth 54d.

In this embodiment, radially outermost surface 104 of shift assist tooth 54a' forms a first tip 108 having a first tip radius $R_{T1}$, a second tip 112 having a second tip radius $R_{T2}$, and a third tip 116 having a third tip radius $R_{T3}$. In this case, first tip radius $R_{T1}$ is substantially equal to shift assist tooth radius $R_{SA}$, second tip radius $R_{T2}$ is substantially equal to reference tooth radius $R_R$, and third tip radius $D_{T3}$ is less than reference tooth radius $R_R$. The portion of radially outermost surface 104 between first tip 108 and third tip 116 has a concave shape to accommodate connecting pin 30 in chain 18, or any other structure surrounding connecting pin 30. The portion of radially outermost surface 104 between first tip 108 and second tip 112 has a convex shape to avoid unnecessary wear on the portion of shift assist tooth 54a' above the reference tooth radius $R_R$.

Figure 8:
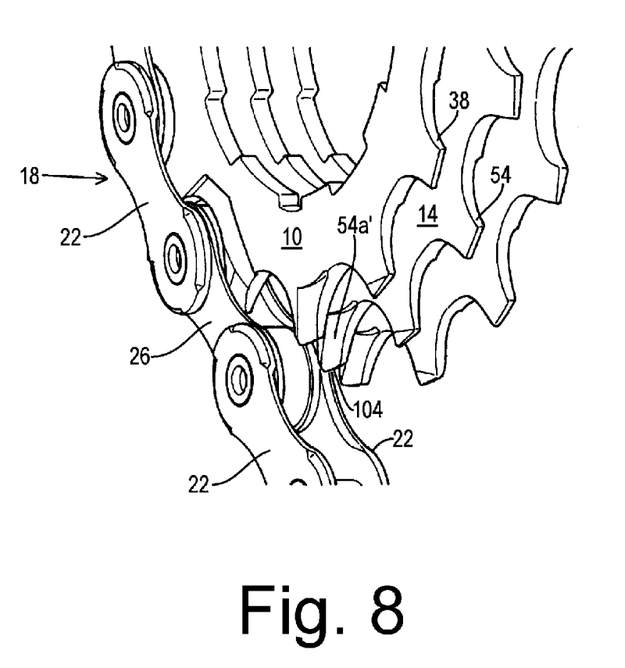
FIG. 8 is an oblique view illustrating shifting of a bicycle chain from the first sprocket to the second sprocket when the shift assist tooth shown in FIGS. 6A and 6B is aligned with the outer link plate of the bicycle chain.

FIG. 8 is an oblique view illustrating shifting of bicycle chain 18 from smaller diameter sprocket 10 to larger diameter sprocket 14 when shift assist tooth 54a' aligns with outer link plates 22 of bicycle chain 18 and the derailleur movement is less than anticipated. In this case, the radially outwardly extended portion of shift assist tooth 54a' formed by outer peripheral surface 104 reliably catches the inner surface of its adjacent outer link plate 22, and failure of shifting does not occur.

While the above is a description of various embodiments of inventive features, further modifications may be employed without departing from the spirit and scope of the present invention. For example, the extended portion of shift assist tooth 54a' formed by outer peripheral surface 104 may be applied to shift assist teeth that do not have a laterally projecting portion 54c. The size, shape, location or orientation of the various components may be changed as desired. Some such variations are disclosed in U.S. Pat. No. 4,889,521. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle rear wheel sprocket comprising:
   a sprocket body having a first side surface and a second side surface;
   a plurality of sprocket teeth extending radially outwardly from a root portion of the sprocket body;
   a shift assist recess formed in the root portion below a first sprocket tooth of the plurality of sprocket teeth at the first side surface of the sprocket body;
   wherein a radially outermost surface of a second sprocket tooth of the plurality of sprocket teeth defines a reference tooth radius that originates from a rotational axis of the sprocket;
   wherein a radially outermost surface of a third sprocket tooth of the plurality of sprocket teeth defines a shift assist tooth radius that originates from the rotational axis of the sprocket;
   wherein there is a plurality of the second sprocket teeth so that a majority of all the sprocket teeth on the sprocket body are second sprocket teeth;
   wherein the third sprocket tooth includes:
      a first tip disposed radially outwardly from the reference tooth radius; and
      a second tip disposed radially inwardly from the first tip;
      wherein all of the radially outermost surface of the third sprocket tooth from the first tip to the second tip has a convex shape;
   wherein the first sprocket tooth is positioned ahead of the third sprocket tooth in a driving rotation direction of the sprocket;
   wherein the first sprocket tooth has a radially outermost surface with a radius less than the shift assist tooth radius; and
   wherein the shift assist tooth radius is greater than the reference tooth radius of each of the plurality of second teeth.

2. The sprocket according to claim 1 wherein the first sprocket tooth has a radially outermost surface with a radius that is substantially equal to the reference tooth radius of at least one of the plurality of second sprocket teeth.

3. The sprocket according to claim 1 further comprising a plurality of the third sprocket teeth.

4. The sprocket according to claim 1 wherein all of the plurality of sprocket teeth that are not third sprocket teeth have a radially outermost surface with a radius substantially equal to the reference tooth radius of at least one of the plurality of second sprocket teeth.

5. The sprocket according to claim 1 wherein a portion of the radially outermost surface of the third sprocket tooth, that has a radius greater than the reference tooth radius, has a convex shape.

6. The sprocket according to claim 5 wherein a portion of the radially outermost surface of the third sprocket tooth, that has a radius greater than the reference tooth radius, has a concave shape.

7. The sprocket according to claim 1 wherein the second tip has a radius substantially equal to the reference tooth radius.

8. The sprocket according to claim 1 wherein the third sprocket tooth comprises a third tip disposed radially inwardly from the first tip.

9. The sprocket according to claim 8 wherein the third tip has a radius less than the reference tooth radius.

10. The sprocket according to claim 9 wherein the second tip is disposed on a first side of the first tip, wherein the third tip is disposed on a second side of the first tip, and wherein the first side is opposite the second side.

11. The sprocket according to claim 10 wherein the second tip is disposed downstream of the third tip in a drive rotational direction of the sprocket.

12. The sprocket according to claim 11 wherein the radially outermost surface of the third sprocket tooth between the first tip and the second tip has a convex shape.

13. The sprocket according to claim 1 wherein a root portion side surface of the root portion defines a root portion plane at the first side surface of the sprocket body below the third sprocket tooth, and wherein the third sprocket tooth has a projecting portion that extends laterally outwardly from the root portion plane at the first side surface of the sprocket body.

14. The sprocket according to claim 13 wherein the projecting portion is formed by a top edge of the third sprocket tooth, and wherein the top edge is inclined relative to the root portion plane.

* * * * *